(12) United States Patent
Föge et al.

(10) Patent No.: US 8,025,134 B2
(45) Date of Patent: Sep. 27, 2011

(54) FRICTION LINING

(75) Inventors: Volker Föge, Ebensee (AT); Zisis Tsioptsias, Gmunden (AT)

(73) Assignee: Miba Frictec GmbH (AT)

( * ) Notice: Subject to any disclaimer, the term of this patent is extended or adjusted under 35 U.S.C. 154(b) by 877 days.

(21) Appl. No.: 12/012,955

(22) Filed: Feb. 6, 2008

(65) Prior Publication Data

US 2008/0308365 A1 Dec. 18, 2008

(30) Foreign Application Priority Data

Feb. 9, 2007 (AT) .................... A 211/2007

(51) Int. Cl.
*F16D 69/00* (2006.01)

(52) U.S. Cl. ............... 188/251 A; 428/143; 427/203

(58) Field of Classification Search .......... 188/251 A; 428/143, 144, 323, 408; 427/404, 383.1, 427/203, 204

See application file for complete search history.

(56) References Cited

U.S. PATENT DOCUMENTS

| | | | |
|---|---|---|---|
| 1,955,572 A | 4/1934 | Adler et al. | |
| 2,225,877 A | 12/1940 | Melton et al. | |
| 2,281,558 A | 5/1942 | Cross | |
| 2,322,156 A | 6/1943 | Oglesby | |
| 2,411,867 A | 12/1946 | Brenner | |
| 3,048,482 A | 8/1962 | Hurst | |
| 3,117,845 A | 1/1964 | Reed | |
| 3,508,890 A | 4/1970 | Fontanella | |
| 3,692,341 A | 9/1972 | Brown et al. | |
| 4,662,972 A | 5/1987 | Thompson | |
| 4,835,013 A | 5/1989 | Heck et al. | |
| 5,083,650 A | 1/1992 | Seiz et al. | |
| 5,259,280 A | 11/1993 | Hoy | |
| 5,958,507 A * | 9/1999 | Lam et al. ............... 427/203 | |
| 6,182,804 B1 | 2/2001 | Lam | |
| 6,347,905 B1 | 2/2002 | Lukschandel | |
| 2003/0087097 A1 | 5/2003 | Lukshandel et al. | |
| 2004/0043193 A1 | 3/2004 | Chen et al. | |

FOREIGN PATENT DOCUMENTS

| | | |
|---|---|---|
| AT | 387 395 | 6/1988 |
| CH | 542274 A | 9/1973 |
| DE | 7009386 U | 9/1972 |
| DE | 2832609 A1 | 1/1980 |
| DE | 295 21 198 | 2/1997 |
| DE | 101 48 831 | 4/2003 |
| DE | 698 31 821 | 5/2006 |
| DE | 602 10 953 | 9/2006 |
| EP | 0386652 A1 | 9/1990 |
| EP | 0 521 256 | 1/1993 |
| EP | 0 854 305 | 7/1998 |
| EP | 0 961 038 | 12/1999 |
| EP | 1 394 438 | 3/2004 |

OTHER PUBLICATIONS

Partial European Search Report, EP 0802097, dated Dec. 22, 2010.

* cited by examiner

*Primary Examiner* — Pamela Rodriguez
(74) *Attorney, Agent, or Firm* — Lerner, David, Littenberg, Krumholz & Mentlik, LLP

(57) ABSTRACT

The invention describes a friction lining (4) comprising a binding agent matrix (5) and friction particles (6), which binding agent matrix (5) forms a coating with a pre-definable coating thickness. A proportion of the friction particles (6) selected from a range with a lower limit of 20% and an upper limit of 100%, by reference to the total quantity of the friction particles (6), has a diameter which is bigger than the coating thickness of the binding agent matrix (5).

18 Claims, 1 Drawing Sheet

FRICTION LINING

The applicants claim the priority of Austrian patent application No. A 211/2007 of 9 Feb. 2007 in accordance with 35 U.S.C. §119.

BACKGROUND OF THE INVENTION

1. Field of the Invention

The invention relates to a friction lining, comprising a binding agent matrix and friction particles, which binding agent matrix forms a coating with a pre-definable coating thickness, a friction component with a metal component body which has a functional surface for producing a frictional grip with another friction component, which functional surface is at least partially provided with a friction lining, and a friction unit comprising at least a first and a second friction component which can be moved into a friction grip with it, and both the first and the second friction component each have at least one functional surface for producing the frictional grip, and at least one of the functional surfaces is at least partially provided with a friction lining.

2. Prior Art

Developments in the automotive industry towards high performance engines has made it necessary to adapt other components of a motor vehicle, such as the clutch system or brake system for example, to the higher performance of these engines. There is also an evident tendency to produce vehicles of an increasingly lighter weight in order to reduce fuel consumption. It is therefore necessary to produce components for motor vehicles that are of a simpler design and made from materials that are more lightweight.

A high performance friction material is known from patent specification DE 698 31 821 T2, for example. It comprises a two-layered material with a fiber base with a secondary or top layer joined to a primary or bottom layer. The primary layer contains non-linear fibers, cotton fibers and filler material and the secondary layer contains amide fibers, optionally synthetic graphite, optionally filler materials and optionally processing agents. The secondary layer also contains cotton fibers and porous carbon particles.

Patent specification DE 602 10 953 T2 discloses a friction material with a first layer containing a fibrous base material and a second layer containing at least one type of a friction-modifying particle on a top face of the fibrous base material. The second layer has an average thickness of approximately 30 to 200 µm. The top layer has a permeability which is lower than that of the first layer. The friction-modifying particles contain silicon oxide particles with an average diameter of approximately 0.1 to approximately 80 µm and an irregular shape.

Friction linings with a single layer are also known. For example, patent specification AT 387 395 describes a method of coating a support base with a friction lining bonded by synthetic resin, which is joined to the support base by an adhesion-imparting layer and produced by compacting and heat curing a friction powder mixture containing a synthetic resin which can be cured by applying heat. The friction powder mixture is firstly applied to the support base in a coating thickness that will result in the desired density of the final thickness of the friction lining and the applied friction powder coating is then heated to a temperature above the melting range of the curable synthetic resin and pressed to the final thickness of the friction lining before a degree of curing is reached that would detrimentally affect the subsequent improvement. To impart adhesion, the surfaces of the support bases to be lined may be coated with a viscous, adhesive resin, e.g., phenolic resin. A raw powder which is preferably the main component of the friction powder mixture with a narrowly limited screen fraction of 0.15 to 0.20 mm may be scattered directly onto this coating. The scattered quantity is set so that approximately 30% to 40% of the scattered surfaces are covered with raw powder. The actual coating of raw powder can be applied before the layer of adhesive resin is fully cured.

OBJECTIVES AND ADVANTAGES OF THE INVENTION

The objective of this invention is to propose a friction lining which can be made more cost-effectively than known friction linings.

This objective is achieved, in each case independently, by the friction lining outlined above, in which a proportion of the friction particles selected from a range with a lower limit of 20% and an upper limit of 100%, by reference to the total quantity of the friction particles, has a diameter that is bigger than the coating thickness of the binding agent matrix, by the friction component provided with the friction lining proposed by the invention and by the friction unit, in which the functional surface is at least partially provided with the friction lining proposed by the invention or in which the friction component proposed by the invention is mounted. This ensures with greater reliability that the friction particles will stand out above the surface of the binding agent matrix, thereby imparting a high friction effect to the friction lining. Since the friction particles have a bigger diameter than the coating thickness of the binding agent matrix, these friction particles also extend deep into the binding agent matrix, which means that there is no need to provide additional reinforcing agents to strengthen the binding agent matrix. It is therefore not necessary to provide friction particles of different screen fractions in the binding agent matrix in order to fulfill these functions, namely strengthen the binding agent matrix and in particular enhance the friction effect. Furthermore, friction particles torn out of the binding agent matrix leave behind a volume of the same size, which is turn beneficial for wet applications because when the friction grip is established, the respective fluid, for example brake fluid or oils, will penetrate these volumes, thereby producing a correspondingly high friction effect.

The friction particles may have a mean size selected from a range with a lower limit of 2 µm and an upper limit of 200 µm. It is therefore possible to provide different coating thicknesses of the friction lining, in which case a sufficient number of friction particles will still project out beyond the binding agent matrix, even in the case of thicker coating thicknesses, in order to mesh with another component. If the mean size is smaller than 2 µm, there is a risk that the binding agent matrix will become too thin, in which case the service life of the friction lining would be shortened to too high a degree. No improvement in the friction lining was observed using particles sizes in excess of 200 µm.

Within the context of the invention, therefore, friction particles with a mean size selected from a range with a lower limit of 20 µm and an upper limit of 150 µm, in particular a lower limit of 30 µm and an upper limit of 125 µm, preferably a lower limit of 40 µm and an upper limit of 75 µm, may be used. For example, friction particles with a mean size selected from a range with a lower limit of 10 µm and an upper limit of 60 µm may be used.

At this stage, it should be pointed out that by mean size is meant the arithmetical mean, which means that it is perfectly possible within the context of the invention for individual friction particles or hard particles to have a grain size which is below or above the specified limits. However, the predominant majority of the particles are of a grain size which lies within the specified grain size ranges.

The binding agent matrix itself may have a coating thickness selected from a range with a lower limit of 1 μm and an upper limit of 150 μm. This being the case, it is possible to vary the behavior of the friction lining accordingly so that forces of differing intensities can be transmitted. In this manner, for example, it is also possible to prevent any risk of the friction component to which the friction lining is applied of breaking because the coating thickness of the friction lining is selected so that, with effect from a certain maximum force or with effect from a certain maximum moment, it is the friction lining coating that will break first.

In advantageous embodiments, the coating thickness of the binding agent matrix is selected from a range with a lower limit of 5 μm and an upper limit of 100 μm respectively a lower limit of 50 μm and an upper limit of 75 μm. By preference, the binding agent matrix has a coating thickness selected from a range with a lower limit of 10 μm and an upper limit of 20 μm, which means that it is possible to provide very thin friction linings compared with the friction linings known from the prior art but with at least more or less the same properties, thereby making the friction components or friction unit more compact and creating the associated advantages for automotive construction.

The proportion of binding agent matrix in the friction lining may be selected from a range with a lower limit of 5% by weight and an upper limit of 80% by weight. Below 5% by weight, it has been found that cohesiveness within the friction lining coating is reduced, which means that friction particles are lost, thereby reducing the effectiveness of the friction lining. Above 80% by weight, it has been found during tests that increasing the proportion of binding agent in the friction lining does not lead to any further improvement to the friction lining. Instead, it must be assumed that the properties are detrimentally affected due to the reduced proportion of friction particles in and/or on the friction lining.

The proportion of binding agent may be selected from a range with a lower limit of 15% by weight and an upper limit of 60% by weight respectively from a range with a lower limit of 20% by weight and an upper limit of 40% by weight. For example, the proportion of binding agent may be selected from a range with a lower limit of 20% by weight and an upper limit of 55% by weight.

In yet another embodiment, the friction particles stand out from both underneath and the top of the coating on the binding agent matrix, in other words in the direction towards the base of the friction lining on the one hand and in the direction towards the other friction component with which it is engaged or establishes a friction grip on the other hand. The fact that the friction-generating particles also stand out beyond the bottom face of this friction lining leads to improved adhesion on the support, especially if the friction lining is formed on or applied to the support under pressure. This effect is based on the fact that the friction particles transmit a corresponding pressing force to the co-operating surface of the support during application, which leads to a micro-form fit between the support and friction particles, which prevents the friction lining from peeling off.

This embodiment offers particular advantages if the surface of the support is roughened in the region of the friction lining beforehand, for example sand-blasted, or if this surface already has a certain porosity, for example the support is made from a sintered material, because this enables the "clawing effect" to be enhanced.

In an even more preferred embodiment, a proportion of the friction particles extends through the entire coating thickness of the binding agent matrix so that one and the same friction particle projects out beyond both the first outer and second inner surface of the friction lining. This provides a direct contact for the friction particles creating the friction grip with the metal support of the friction component, which leads to improved heat dissipation of the heat which occurs as a result of the friction, even in the case of dry friction units.

In this respect, it is of advantage if this proportion of the friction particles extending through the entire coating thickness of the binding agent matrix is selected from a range with a lower limit of 20% and an upper limit of 80%, by reference to the total quantity of friction particles. In particular, this proportion is selected from a range with a lower limit of 30% and an upper limit of 70%, preferably from a range with a lower limit of 40% and an upper limit of 50%.

This is possible due to the fact that, prior to curing the binding agent, a pressure is applied to the friction lining so that the friction particles are pushed through the still soft binding agent matrix.

In this respect, it is of advantage if friction particles are selected which have a heat conductivity λ at 20° C. of at least 40 W/mK, in particular at least 70 W/mK, preferably at least 100 W/mK. It is also of advantage if the heat conductivity λ at 1000° C. is at least 21 W/mK.

The surface coating of friction particles on the outer surface of the friction lining may be selected from a range with a lower limit of 3% by surface area and an upper limit of 45% by surface area. By outer surface of the friction lining is mean that surface which can be moved into a friction grip with another component of a friction unit. Again, it was observed that surface coatings of less than 3% by surface area caused a reduction in the friction effect, whereas a surface coating of more than 45% by surface area did not lead to any appreciable further increase in the friction effect.

The surface coating may be selected from a range with a lower limit of 8% by surface area and an upper limit of 35% by surface area, in particular a lower limit of 15% by surface area and an upper limit of 25% by surface area, for example.

In order to improve the properties of the friction lining, it may contain at least one other additive in a proportion selected from a range with a lower limit of 0.5% by weight and an upper limit of 10% by weight.

This additive may be selected from a group comprising pigments, such as carbon black, iron oxide or titanium oxide for example, other fillers, such as silicic acid, talcum, silicates for example, other corrosion inhibitors such as phosphates, for example zinc phosphate, other agents which affect rheology, such as highly disperse silicic acid, layered silicates or polymeric urea compounds as well as other fibers, for example metal fibers or synthetic fibers, in order to increase maximum strength if necessary.

Fillers may be used to minimize the cost of the friction lining, amongst other things, and may also change the properties of the friction lining itself.

With respect to corrosion inhibitors, it should be pointed out that these are intended to prevent corrosive attack of the friction lining coating or the metal surface lying underneath.

Agents which affect rheology can improve the processability of the friction lining, i.e. the binding agent resin or binding agent lacquer.

At this stage, it should be pointed out that within the context of the invention, it is possible to incorporate other additives or combinations of individual additives in the friction lining, although such additives are known from the lacquer and varnish industry and need no further explanation here.

By preference, a total proportion of several different additives in the friction lining is no higher than 25% by weight, because proportions in excess of this can have a detrimental effect on the properties of the friction lining under certain circumstances. The proportion is given by reference to the total friction lining, in other words binding agent with friction particles and additives.

Although it is possible to use fibrous additives as mentioned above, the friction lining is free of fibers in a preferred embodiment. This enables an oncologically improved friction lining to be produced.

Within the context of the invention, the friction particles may be of any possible shape, although it is preferable if these friction particles are of a spherical or nodular shape or approximately cuboid with a polygonal cross-section. In particular, it is of advantage if these friction particles have pronounced tips, thereby enabling the friction effect to be improved.

Specific properties of the friction lining or friction coating, in particular with regard to increasing the coefficient of friction, reduced noise, resistance to temperature as well as heat conductivity, were observed in the friction lining proposed by the invention if the binding agent used is a phenolic resin, which may or may not be modified, and the friction particles are silicon carbide. This binding agent improves adhesion of the friction lining to the support, in other words the friction component. Modified phenolic resins may also be used, for example phenolic resins admixed with silicone resins.

However, it should be pointed out that, within the context of the invention, it is also possible to use other binding agents for the binding agent matrix of the friction lining or friction coating. These binding agents may be selected, for example, from a group comprising polyvinyl fluoride, polyvinylidene fluoride, polyester imides, polyimide resins, such as carboran imides, aromatic polyimide resins, hydrogen-free polyimide resins, poly-triazo pyromellitic imides, polyamide imides, in particular aromatic, polyaryl ether imides, optionally modified with isocyanates, polyether imides, optionally modified with isocyanates, acrylic resins, epoxy resins, epoxy resin esters, polyamide 6, polyamide 66, polyoxymethylene, polyaryl ether, polyaryl ketones, polyaryl ether ketones, polyaryl ether-ether ketones, polyether-ether ketones, Polyether ketones, polyethylene sulfides, allylene sulfide, poly-triazo pyromellitic imides, polyester imides, polyaryl sulfides, polyvinylene sulfides, polyphenylene sulfides, polysulfones, polyether sulfones, polyaryl sulfones, polyaryl oxides, polyaryl sulfides or copolymers thereof.

Within the context of the invention, it is also possible to use mixtures of at least two of these binding agents in the friction lining, such as for example polyvinyl fluoride and/or polyvinylidene fluoride and/or polyester imides and/or polyimide resins, such as for example carboran imides, and/or aromatic polyimide resins and/or hydrogen-free polyimide resins and/or poly-triazo pyromellitic imides and/or polyamide imides, in particular aromatic, and/or polyaryl ether imides, optionally modified with isocyanates, and/or polyether imides, optionally modified with isocyanates, and/or acrylic resins and/or epoxy resins and/or epoxy resin esters and/or phenolic resins and/or polyamide 6 and/or polyamide 66 and/or polyoxymethylene and/or polyaryl ether and/or polyaryl ketones and/or polyaryl ether ketones and/or polyaryl ether-ether ketones and/or polyether-ether ketones and/or Polyether ketones and/or polyethylene sulfides and/or allylene sulfide and/or poly-triazo pyromellitic imides and/or polyester imides and/or polyaryl sulfides and/or polyvinylene sulfides and/or polyphenylene sulfides and/or polysulfones and/or polyether sulfones and/or polyaryl sulfones and/or polyaryl oxides and/or polyaryl sulfides with polyvinyl fluoride and/or polyvinylidene fluoride and/or polyester imides and/or polyimide resins, such as for example carboran imides, and/or aromatic polyimide resins and/or hydrogen-free polyimide resins and/or poly-triazo pyromellitic imides and/or polyamide imides, in particular aromatic, and/or polyaryl ether imides, optionally modified with isocyanates, and/or polyether imides, optionally modified with isocyanates, and/or acrylic resins and/or epoxy resins and/or epoxy resin esters and/or phenolic resins and/or polyamide 6 and/or polyamide 66 and/or polyoxymethylene and/or polyaryl ethers and/or polyaryl ketones and/or polyaryl ether ketones and/or polyaryl ether-ether ketones and/or polyether-ether ketones and/or polyether ketones and/or polyethylene sulfides and/or allylene sulfide and/or poly-triazo pyromellitic imides and/or polyester imides and/or polyaryl sulfides and/or polyvinylene sulfides and/or polyphenylene sulfides and/or polysulfones and/or polyether sulfones and/or polyaryl sulfones and/or polyaryl oxides and/or polyaryl sulfides.

As friction particles or hard particles, it is also possible to use particles selected from a group comprising metal oxides such as for example $CrO_3$, $Fe_3O_4$, $ZnO$, $CdO$, $Al_2O_3$ (corundum), $MnO$, nitrides such as for example $Si_3N_4$, $AlN$, cubic $BN$, as well as $SiO_2$, spheroidal carbon, diamond, carbides such as for example $CaC_2$, $Mo_2C$, $WC$, $B_4C$, metal particles such as for example $Zn$, $Ba$, $Cd$, $Co$, $Cu$, steel, as well as phosphides such as for example $Fe_3P$, metal borides such as for example $Fe_2B$, $Ni_2B$, $FeB$, silicides, thiophosphates such as for example zinc thiophosphate, as well as glass.

It is likewise also possible to use combinations of different friction or hard particles, such as for example $CrO_3$ and/or $Fe_3O_4$ and/or $ZnO$ and/or $CdO$ and/or $Al_2O_3$ (corundum) and/or $MnO$ and/or $Si_3N_4$ and/or $AlN$ and/or cubic $BN$ and/or $SiO_2$ and/or spheroidal carbon and/or diamond and/or $SiC$ and/or $CaC_2$ and/or $Mo_2C$ and/or $WC$ and/or $B_4C$ and/or $Zn$ and/or $Ba$ and/or $Cd$ and/or $Co$ and/or $Cu$ and/or steel and/or $Fe_3P$ and/or $Fe_2B$ and/or $Ni_2B$ and/or $FeB$ and/or silicides and/or thiophosphates, such as for example zinc thiophosphate, and/or glass with $CrO_3$ and/or $Fe_3O_4$ and/or $ZnO$ and/or $CdO$ and/or $Al_2O_3$ (corundum) and/or $MnO$ and/or $Si_3N_4$ and/or $AlN$ and/or cubic $BN$ and/or $SiO_2$ and/or spheroidal carbon and/or diamond and/or $SiC$ and/or $CaC_2$ and/or $Mo_2C$ and/or $WC$ and/or $B_4C$ and/or $Zn$ and/or $Ba$ and/or $Cd$ and/or $Co$ and/or $Cu$ and/or steel and/or phosphides such as for example $Fe_3P$ and/or $Fe_2B$ and/or $Ni_2B$ and/or $FeB$ and/or silicides and/or thiophosphates, such as for example zinc thiophosphate, and/or glass.

By particular preference, the friction component is a synchronizer ring, brake disc, brake pad, clutch disc or a screw and the friction unit may be a differential lock, dry or wet clutch, dry or wet brake, disc brake, holding brake, safety brake, hydrostatic drive or screw connection.

The invention further relates to the use of the friction unit, in particular as a means of transmitting torque or in applications involving dynamic friction, as well as the use of the friction lining to secure screw connections.

By dynamic friction is meant the friction which occurs between two bodies which are moved relative to one another. This is different from static friction.

BRIEF DESCRIPTION OF THE DRAWINGS

In order to provide a clearer understanding of the invention, it will be explained in more detail below. The highly schematic, simplified diagrams show the following.

DETAILED DESCRIPTION OF PREFERRED EMBODIMENTS

Figure 1:
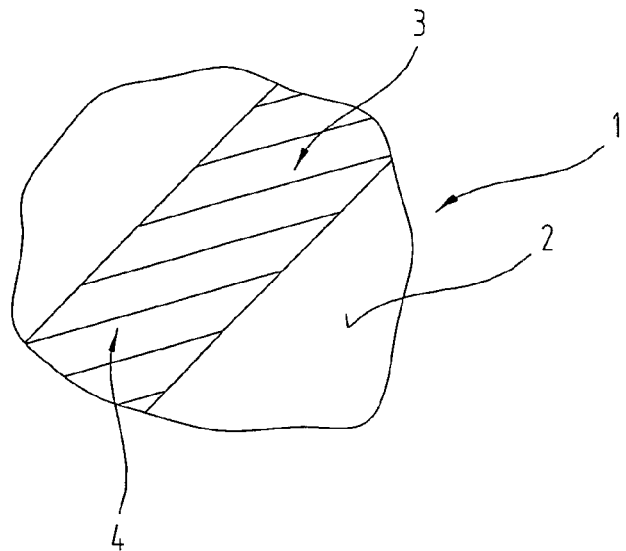
FIG. 1 a detail of a friction component with a friction lining disposed on certain parts of it.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

All the figures relating to ranges of values in the description should be construed as meaning that they include any and all part-ranges, in which case, for example, the range of 1 to 10 should be understood as including all part-ranges starting from the lower limit of 1 to the upper limit of 10, i.e. all part-ranges starting with a lower limit of 1 or more and ending with an upper limit of 10 or less, e.g. 1 to 1.7, or 3.2 to 8.1 or 5.5 to 10.

FIG. 1 illustrates a friction component 1 with a first surface 2. Applied to this surface 2 is a functional surface 3, which is designed to provide a friction grip contact on a second friction component, although the latter is not illustrated. This functional surface is provided with a friction lining 4 or friction lacquer.

Figure 2:
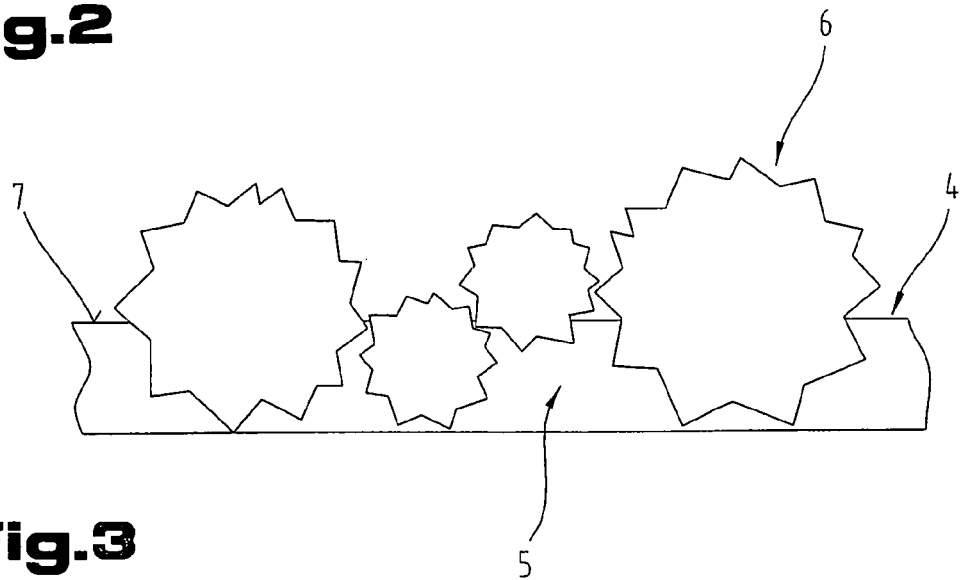
FIG. 2 a cross-section through a friction lining with friction particles embedded in it.

This friction lining 4 is better illustrated in FIG. 2. It comprises a binding agent matrix 5, in which friction particles 6 are embedded so that they extend above the binding agent matrix surface 7.

The friction particles 6 preferably have a Mohs hardness selected from a range with a lower limit of 8 and an upper limit of 10.

It should be pointed out that within the context of the invention, not all the friction particles 6 need necessarily stand up above the binding agent matrix surface 7. Instead, a proportion of the friction particles 6 are completely embedded in the binding agent matrix 5. As a result, if individual friction particles 6 are lost and the binding agent matrix 5 is abraded, these friction particles 6 that are fully embedded can be exposed, which enables a resistance to galling to be imparted to the friction lining 4.

Furthermore, not all the friction particles 6 need be more or less the same size, and instead, it is possible to provide a spectrum or one or more screen fractions of different diameters of friction particles 6.

The friction particles 6 are preferably of a shape that is not elongate, in other words are approximately round or nodular, as may be seen from FIG. 2. This prevents the friction particles 6 from being embedded in the binding agent matrix 5 in a preferred orientation.

The friction particles 6 preferably have pronounced tips and edges in order to increase the friction effect.

Figure 3:
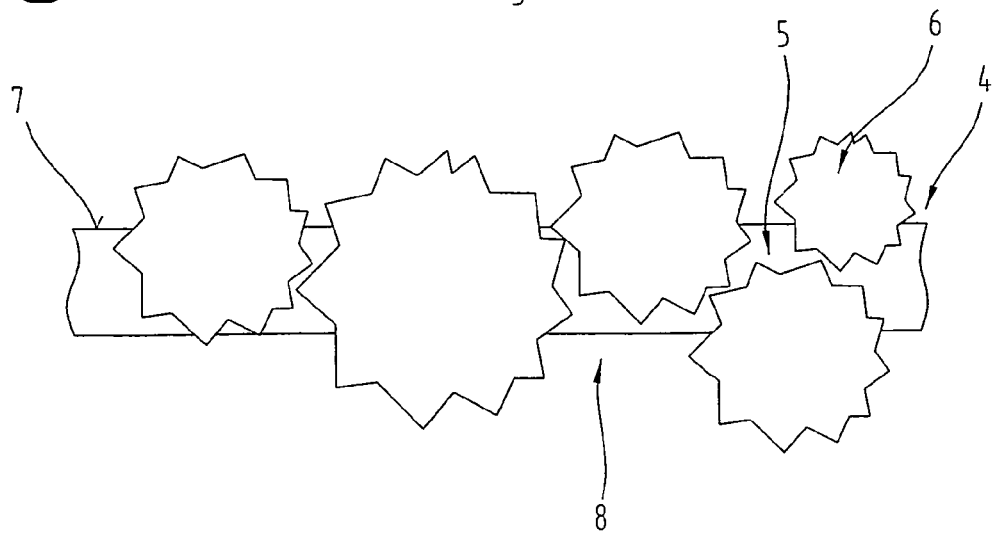
FIG. 3 a cross-section through a different embodiment of the friction lining illustrated in FIG. 2.

FIG. 3 illustrates a different embodiment of the friction lining 4. In this case, the friction particles 6 extend out beyond the outer binding agent matrix surface 7 and beyond the bottom binding agent matrix surface 8 directed towards the friction component 1. This results in the properties of the friction lining 4 discussed above.

In the context of the invention, the friction lining 4 proposed by the invention was applied to friction components 1 in the form of synchronizer rings, brake discs, brake pads, clutch discs and friction components 1 of friction units in the form of differential locks, dry or wet clutches, dry or wet brakes, disc brakes, holding brakes, safety brakes or hydrodynamic drives. The coating was applied to the functional surfaces 3. By functional surface 3 in the context of the invention is meant a surface of a friction component 1 which can be moved into a friction grip and optionally a form fit with another friction component.

Since the invention primarily relates to the friction lining 4 itself and not to the mechanical design of such friction units or friction components 1, there is no need to provide a description of these at this stage because they are known from the relevant prior art. For more details on these aspects, therefore, the skilled person may refer to this literature (e.g. Fahrzeuggetriebe; G. Lechner, H. Naunheimer; Springer, 1994).

It should also be pointed out that in the description of the invention, it is not possible to list all the combinations of possible binding agents and friction particles 6 and other optional additives because this would make the scope of this description too extensive. For an idea of the general trend, reference may be made to the explanations given above.

By "wet" applications within the context of the invention is meant applications of the friction lining 4 in which the friction lining 4 is wetted or impregnated with a fluid during use, e.g. a brake fluid or a fluid for an automatic gear. During use of the "wet" friction material, the fluid is squeezed out of the friction material.

To ensure that the friction lining 4 is suitable for "wet" application situations, it must exhibit a number of properties. For example, the friction lining 4 should be flexible or elastic but resistant to compression stress, abrasion and tension, it should have a high heat resistance and be in position to emit its heat rapidly. It should have a long-lasting, durable and consistent friction behavior.

All of these properties are achieved by the friction lining 4 proposed by the invention. In order to obtain the requisite elasticity for wet applications of the friction lining 4, appropriate synthetic resins which exhibit this elasticity after curing are used as the binding agent. It is possible to modify the synthetic binding agent, for example by selecting the chain length or number and type of side chains and functional group on the polymer threads of the synthetic resin accordingly. This has often been described in the background literature, for example in "Ullmann's Encyclopedia of Industrial Chemistry, Urban & Schwarzenberg; Munich, 5th edition, 1997".

The support of the friction lining 4 is usually made from a metal material. It may be produced both by a casting process or as a sintered component. Supports made both from pure metals and alloys of several metals are possible. For example, steel, materials with a base of aluminum, iron, copper or magnesium may be used. Examples of sintered metal alloys may be found in DIN V 30 910 Part 4, page 3.

Example 1

The functional surface 3 of a synchronizer ring made from steel was coated. This sheet steel serves as a support base.

A friction lining 4 comprising 45% by weight of phenolic resin as a binding agent matrix 5 and 55% by weight of silicon carbide particles as friction particles 6 was applied to this functional surface 3.

To produce the friction lining 4, phenolic resin in the form of a dispersion was applied to the functional surface 3. Ethanol was used as a solvent or dispersing agent in a proportion of 25% by reference to the phenolic resin with solvent.

At this stage, it should be pointed out that other solvents or dispersing agents may be used, such as for example alcohols generally, butanone, xylene, and aromatic solvents generally. The proportion of solvent may be between 15% and 40%, in particular between 20% and 30%, by reference to the phenolic resin with solvent.

The silicon carbide particles were then scattered onto the just cured phenolic resin. Of the silicon carbide particles used, 50% had a particle diameter of 40 μm. The phenolic resin was applied in a coating thickness of 20 μm.

After scattering on the silicon carbide particles, the phenolic resin was cured at a temperature of 220° C., causing the silicon carbide particles to be embedded in the phenolic resin matrix.

Produced in this manner, the friction lining 4 exhibits very good friction properties and low noise generation.

Example 2

By contrast with example 1, a pressure was applied to the friction lining before setting the phenolic resin matrix, as a result of which the silicon carbide particles were pushed into the matrix. This enable better heat conductivity to be obtained and it was also found that the delamination properties were better.

In this respect, it should be pointed out that, because of the possible low coating thickness of the friction lining 4, it is not absolutely necessary for the friction particles 6 to be pushed through the binding agent coating in order to produce a contact with the support material because the slim coating thickness left between the friction particles 6 and support has only a slight effect on heat dispersion.

However, the direct contact between the support and friction particles 6 always exhibits better heat conductivity and a higher adhesion capacity of the friction lining 4.

The pressure on the friction lining was maintained for a period of 15 s to 30 s after heating to 250° C. A pressure of 15 N/mm$^2$ was applied.

The synchronizer ring may be coated with the phenolic resin in an appropriate mold by means of a spray nozzle and the silicon carbide particles scattered in the still open mold onto the phenolic resin. After closing the mold, it was supplied with the increased temperature and the pressure.

Example 3

By contrast with example 1, an adhesion-imparting agent was applied to the functional surface with a view to increasing adhesive strength—not absolutely necessary in the context of the invention—before applying the phenolic resin. The adhesion-imparting agent used was a so-called primer with a base of phenolic resin (diluted phenolic resin). It would naturally also be possible to use other adhesion-imparting agents, such as silanes for example, without departing from the scope of the invention.

Example 4

By contrast with example 3, in order to increase the adhesion of the friction lining 4 on the support body, its surface was scattered with sand.

The surface may also be pre-treated by polishing.

Instead of the mechanical surface treatment, another option is to apply a chemical surface treatment, for example by etching the surface, in which case the etching agent will naturally depend on the substance used for the support material. Applying phosphate to the surface or activating the surface in plasma are other options.

Example 5

A friction lining 4 with a phenolic resin base of the above composition (example 1) was produced on a clutch disc made from a sintered material "Sint D11" (conforming to DIN 30910-4). Again, pressure was applied to the silicon carbide particles in order to obtain a mechanical clawing with the sintered material.

This example offers significantly higher adhesion capacity of the friction lining 4 on the surface of the sintered component.

Examples 6 to 10

Examples 1 to 5 were repeated but the phenolic resin was replaced by a polyamide imide resin. The proportion of polyamide imide resin on the friction lining 4 was 55%.

Similar properties to those of the friction linings produced for examples 1 to 5 were observed.

The table below sets out other examples of the invention, i.e. the friction lining 4 proposed by the invention.

| | | | Proportion of binding agent [%] | | | Proportion of friction particles [%] | | | | | |
| --- | --- | --- | --- | --- | --- | --- | --- | --- | --- | --- | --- |
| Nr. | PI | PA I | Acrylic resin | Epoxy resin | Phenolic resin | SiC | Al$_2$O$_3$ | Zn | Diamond | Steel | BN |
| 11 | | 30 | | | | | 70 | | | | |
| 12 | | | | 80 | | | 20 | | | | |
| 13 | | | 60 | | | | | 40 | | | |
| 14 | 10 | | | | | 90 | | | | | |
| 15 | 20 | | | | | | 80 | | | | |
| 16 | | | | | 35 | 65 | | | | | |
| 17 | | 40 | | | | 20 | 40 | | | | |
| 18 | | 40 | | | | | 60 | | | | |
| 19 | 30 | 20 | | | | | | | | | 50 |
| 20 | | | 35 | | | | 25 | 40 | | | |
| 21 | | | 10 | | | | | | | 90 | |
| 22 | | | | 40 | | 60 | | | | | |
| 23 | | | | 25 | | 75 | | | | | |

-continued

| | | Proportion of binding agent [%] | | | Proportion of friction particles [%] | | | | | |
|---|---|---|---|---|---|---|---|---|---|---|
| Nr. | PI | PAI | Acrylic resin | Epoxy resin | Phenolic resin | SiC | Al$_2$O$_3$ | Zn | Diamond | Steel | BN |
| 24 | | | | | 5 | 40 | | | | | 55 |
| 25 | | 50 | | | | 50 | | | | | |

In order to produce the friction lining 4, it is also possible, in addition to the scattering method described above, to produce a dispersion of the polymerisable synthetic binding agent and the friction particles 6 contained in it and apply this dispersion directly to the functional surface 3 of the corresponding friction component 1. With this method, it is usually not necessary to apply pressure as the binding agent matrix is curing because the friction particles 6 already extend very deeply into the binding agent matrix 5 or already penetrate it as they are being applied. This dispersion may be painted on, rolled on or sprayed on. Appropriate printing methods are known from the prior art, such as for example the HVLP method (high volume low pressure), screen printing. The resins used are preferably heat-curable.

It is also of advantage if the friction particles 6 used have a mean diameter which is big enough for at least a proportion of these friction particles 6 to project out above the binding agent matrix by a height selected from a range with a lower limit of 0.5 μm and an upper limit of 70 μm. In particular, these particles have a mean diameter which is such that this height has a value selected from a range with a lower limit of 3 μm and an upper limit of 30 μm. For example, the particles have a mean diameter which is such that this height has a value selected from a range with a lower limit of 0.5 μm and an upper limit of 10 μm.

These values primarily relate to the amount by which the friction particles 6 stand out from the outer surface of the friction component 1, in other words the surface which can be placed in a friction grip with another friction component. At the bottom surface, in other words the surface of the friction lining 4 facing the support or the supporting layer, these friction particles stand out from the binding agent matrix 5 by a height with a value selected from a range with a lower limit of 0.1 μm and an upper limit of 5 μm, in particular selected from a range with a lower limit of 0.1 μm and an upper limit of 2 μm.

The friction lining 4 proposed by the invention is able to withstand lining surface pressures of up to ca. 100 bar, even if this friction lining 4 is used under limited lubricating conditions. A relatively constant friction can also be achieved by the friction lining 4 proposed by the invention during engagement or disengagement of the components of gears and brake systems, for example. This enables forces to be transmitted constantly.

The friction material also has good shearing strength, which means that the friction component 1 itself is able to withstand delamination during use.

In one embodiment of the invention, the friction lining 4 may be used on the thread of a screw or the internal thread of a bore accommodating the screw in order to secure the screw connection. To this end, this friction lining 4 may be applied directly to at least a part-region of the thread of the screw or the thread of the screw seat. In particular, the friction lining 4 proposed by the invention can be used to secure screw connections for which it has been necessary to use additional fixing means in the past, such as for example cotter pins, locking rings or adhesives, which are applied to the thread to prevent the screw connection working loose due to vibrations, for example. With this application of the friction lining 4, the latter not only has the advantage of imparting greater reliability to the screw connection, in addition, the screw connection can also be released several times and screwed back tight again without the friction lining 4 having to be applied again—as is the case with adhesives—after the first release. This therefore eliminates additional work steps during assembly, for example for applying the cotter pins or locking rings.

The embodiments illustrated as examples represent possible variants of the friction lining 4 and it should be pointed out at this stage that the invention is not specifically limited to the variants specifically illustrated, and instead the individual variants may be used in different combinations with one another and these possible variations lie within the reach of the person skilled in this technical field given the disclosed technical teaching. Accordingly, all conceivable variants which can be obtained by combining individual details of the variants described and illustrated are possible and fall within the scope of the invention.

For the sake of good order, finally, it should be pointed out that, in order to provide a clearer understanding of the structure of the friction lining 4, it and its constituent parts are illustrated to a certain extent out of scale and/or on an enlarged scale and/or on a reduced scale.

The objective underlying the independent inventive solutions may be found in the description.

Above all, the individual embodiments of the subject matter illustrated in FIGS. 1, 2; 3 constitute independent solutions proposed by the invention in their own right. The objectives and associated solutions proposed by the invention may be found in the detailed descriptions of these drawings.

| LIST OF REFERENCE NUMBERS | |
|---|---|
| 1 | Friction component |
| 2 | Surface |
| 3 | Functional surface |
| 4 | Friction lining |
| 5 | Binding agent matrix |
| 6 | Friction particles |
| 7 | Binding agent matrix surface |

The invention claimed is:

1. Friction lining comprising a binding agent matrix and friction particles, which binding agent matrix forms a coating with a pre-definable coating thickness, wherein a proportion of the friction particles selected from a range with a lower limit of 20% and an upper limit of 100%, by reference to the total quantity of the friction particles, has a diameter that is bigger than the coating thickness of the binding agent matrix, wherein the coating of said binding agent matrix has an outer surface and a bottom surface, said friction particles extend out beyond the outer binding agent matrix surface and beyond the bottom binding agent matrix surface.

2. Friction lining according to claim 1, wherein the friction particles have a mean size selected from a range with a lower limit of 2 μm and an upper limit of 200 μm.

3. Friction lining according to claim 1, wherein the coating thickness of the binding agent matrix is selected from a range with a lower limit of 1 μm and an upper limit of 150 μm.

4. Friction lining according to claim 1, wherein the proportion of binding agent matrix on the friction lining is selected from a range with a lower limit of 5% by weight and an upper limit of 80% by weight.

5. Friction lining according to claim 1, wherein the coating of binding agent matrix has a first surface and a second surface lying opposite it and a proportion of the friction particles projects out beyond both the first and the second surface.

6. Friction lining according to claim 5, wherein a proportion of the friction particles extends through the entire coating thickness of the binding agent matrix.

7. Friction lining according to claim 1, wherein the surface lining of the friction particles on an outer surface of the friction lining is selected from a range with a lower limit of 3% by surface area and an upper limit of 45% by surface area.

8. Friction lining according to claim 1, wherein the friction lining also contains at least one other additive in a proportion selected from a range with a lower limit of 0.5% by weight and an upper limit of 10% by weight.

9. Friction lining according to claim 8, wherein several additives are contained in the friction lining in a total proportion of a maximum of 25% by weight.

10. Friction lining according to claim 1, wherein it is free of fibers.

11. Friction lining according to claim 1 wherein the friction particles have a spherical or nodal or approximately cuboid shape with a polygonal cross-section.

12. Friction lining according to claim 1 wherein the binding agent matrix is phenolic resin, which may or may not be modified, and the friction particles 6 are silicon carbide.

13. The friction lining according to claim 1 arranged to secure screw connections.

14. Friction component with a metal component body which has a functional surface for establishing a frictional grip with another friction component, and the functional surface is at least partly provided with a friction lining, wherein the friction lining comprising a binding agent matrix and friction particles which binding agent matrix forms a coating with a pre-definable coating thickness, wherein a proportion of the friction particles selected from a range with a lower limit of 20% and an upper limit of 100%, by reference to the total quantity of the friction particles has a diameter that is bigger than the coating thickness of the binding agent matrix, wherein the coating of said binding agent matrix has an outer surface and a bottom surface, said friction particles extend out beyond the outer binding agent matrix surface and beyond the bottom binding agent matrix surface forming micro-form fit between the metal component body and friction particles.

15. Friction component according to claim 14, wherein the friction component is a synchronizer ring, brake disc, brake pad, clutch disc, or a screw.

16. Friction unit comprising at least a first and a second friction component which can be moved into a friction grip with it, and both the first and the second friction component each have at least one functional surface for establishing the friction grip, and at least one of the functional surfaces is at least partially provided with a friction lining, wherein the friction lining comprising a binding agent matrix and friction particles which binding agent matrix forms a coating with a pre-definable coating thickness, wherein a proportion of the friction particles selected from a range with a lower limit of 20% and an upper limit of 100%, by reference to the total quantity of the friction particles has a diameter that is bigger than the coating thickness of the binding agent matrix, wherein the coating of said binding agent matrix has an outer surface and a bottom surface, said friction particles extend out beyond the outer binding agent matrix surface and beyond the bottom binding agent matrix surface forming micro-form fit between the metal component body and friction particles.

17. Friction unit according to claim 16, wherein the friction unit is a differential lock, dry or wet clutch, dry or wet brake, disc brake, holding brake, safety brake, hydrostatic drive or a screw connection.

18. The friction unit according to claim 16 arranged to transmit torques in applications involving dynamic friction.

* * * * *